Dec. 18, 1962 A. G. T. BOERYD ET AL 3,069,508
TELEPHONE INSTRUMENT
Filed April 21, 1959
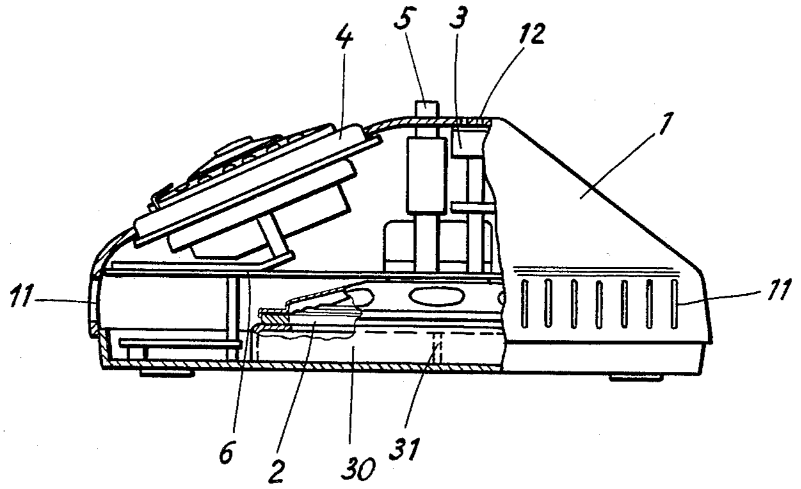
INVENTORS.
ARNE GÖSTA TORILD BOERYD
ULF ROBERT OSCARSON LINDBÄCK
WALTER EMANUEL FREDRIKSSON
INGEMAR MITNITZKY
BY Hane and Nydick
ATTORNEYS

United States Patent Office 3,069,508
Patented Dec. 18, 1962

3,069,508
TELEPHONE INSTRUMENT

Arne Gösta Torild Boeryd and Ulf Robert Oscarson Lindbäck, Stockholm, Walter Emanuel Fredriksson, Alvsjo, and Ingemar Mitnitzky, Bromma, Sweden, assignors to Telefonaktiebolaget L M Ericsson, Stockholm, Sweden, a corporation of Sweden Filed Apr. 21, 1959, Ser. No. 807,827
Claims priority, application Sweden May 2, 1958
3 Claims. (Cl. 179—81)

The present invention relates to a telephone instrument, arranged to work as a loud speaking telephone by aid of an amplifier, a microphone and a loud speaker.

The purpose of the invention is to furnish a loud speaking telephone instrument, which mainly works within the frequency range 300–3400 cycles per second necessary for telephony, and which guarantees a good conversation transmission, avoiding such phenomena as feed-back, echo disturbances, unwanted blocking of a line and so on by the mutual placing of the microphone and the loud speaker. By selecting the placement of the microphone and speaker the telephone instrument can be handled with facility by one or more persons.

A telephone instrument provided according to the invention is characterized in that the loud speaker is placed with its cone aperture downwards in the lower part of the telephone instrument, that the microphone is placed with its sound sensitive part upwards in the upper part of the telephone instrument, and that the casing of the telephone instrument is shaped with apertures for the passage of the acoustic waves partly around the loud speaker and partly in the immediate vicinity of the microphone.

The invention will be further described in connection to the accompanying drawing, which is partly in section, and shows a loud speaker telephone according to the invention.

From the drawing appears that within a casing 1 a loud speaker 2 (an electro dynamic cone loud speaker) is placed with its cone aperture downwards in the lower part of the telephone instrument, and a microphone 3 is placed with its sound sensitive part upwards in the upper part of the telephone instrument. The casing 1 is provided with apertures 11 for the passage of sound waves partly around the loud speaker between two mutually parallel skirts encircling the cone of the loud speaker and apertures 12 in the immediate vicinity of the microphone for passage of sound waves thereto.

More particularly the loud speaker is placed in the lowest situated part of the telephone instrument with its cone aperture against a resonance 30 placed at the bottom of the telephone instrument, and the microphone is p'aced in the highest situated part of the telephone instrument.

Moreover, the telephone instrument contains such connection details and units necessary for exchanging telephone conversations in a normal way, for instance, a dial 4, control buttons 5, an amplifier, a signalling arrangement and so on. These units and details are, however, not more precisely indicated or described, since they fall outside the limit of the present invention.

Between the loud speaker 2 and the microphone 3 a sound insulating disc 6 is arranged in order to prevent sound waves from the loud speaker from entering directly to the microphone. This disc is at the same time used as a mounting plate for certain details. Other details are mounted on the bottom plate of the telephone instrument, and thus they are situated between the loud speaker 2 and the apertures 11. These latter are suitably covered with some acoustically attenuating material, for example silk, on the inside of the casing.

To prevent standing waves from appearing in the resonance case 30, its volume is divided up by means of inserted walls, one of which is indicated 31 and indicated by lines of short dashes on the drawing.

In order that the energy from the loud speaker 2 is not taken out from the front side of its cone, which has been the practice, the output of the loudspeaker is obtained, from its rear side. Accordingly, on one hand, the upper part of the frequency range is cut off, and on the other hand, the sound waves obtain horizontal propagation direction to the listeners around the instrument in a natural way without causing any increased risk of influencing the microphone for that reason. Furthermore, the placing of the microphone is suitable for the one or more speakers around the instrument, for instance, the telephone instrument is usable by many persons during the same conversation.

Thus, the loud speaker is placed with its cone aperture against the resonance case, so that the lower part of the frequency range is cut-off, which is extremely desirable from disturbance point of view. The available direct current effect, which at arrangements of this kind is limited, demands a loud speaker with a great efficiency, for instance, biggest possible cone diameter, whereby also a low distortion in the said frequency range 300–3400 cycles per second is obtained.

As appears in the drawing the shown placing of the loud speaker and microphone gives the greatest possible acoustic wave length between these units.

We claim:

1. A telephone instrument comprising, in combination a casing, a loudspeaker having a cone supported in a downward facing position within said casing, a microphone supported in an upward facing position within said casing and above said loudspeaker, a plurality of sound transmitting apertures in a lower marginal portion of said casing to radiate sound waves in said casing and above said cone therethrough, a plurality of sound transmitting apertures in said casing overlying said microphone, and resonating means secured to a bottom portion of said casing beneath said cone, said resonating means closing an open-side of said cone.

2. A telephone instrument as set forth in claim 1, wherein means is secured in said casing between said loudspeaker and said microphone for sound insulation therebetween.

3. A telephone instrument as set forth in claim 1, wherein said resonating means includes at least one wall therein to eliminate standing waves therein.

References Cited in the file of this patent

UNITED STATES PATENTS

| | | |
|---|---|---|
| 1,385,286 | Timmons | July 19, 1921 |
| 2,385,279 | Hopkins | Sept. 18, 1945 |
| 2,392,321 | Hersey | Jan. 8, 1946 |